United States Patent
Rosenberg

(10) Patent No.: US 7,636,805 B2
(45) Date of Patent: Dec. 22, 2009

(54) METHOD AND APPARATUS FOR COMMUNICATING DATA BETWEEN TWO HOSTS

(75) Inventor: Aron Rosenberg, Berkeley, CA (US)

(73) Assignee: Logitech Europe S.A. (CH)

( * ) Notice: Subject to any disclaimer, the term of this patent is extended or adjusted under 35 U.S.C. 154(b) by 277 days.

(21) Appl. No.: 10/833,363

(22) Filed: Apr. 28, 2004

(65) Prior Publication Data

US 2005/0086358 A1    Apr. 21, 2005

Related U.S. Application Data

(60) Provisional application No. 60/512,667, filed on Oct. 20, 2003.

(51) Int. Cl.
*G06F 13/12* (2006.01)
(52) U.S. Cl. .............................. 710/72; 710/33; 710/65; 718/1; 718/107; 370/260
(58) Field of Classification Search ...................... None
See application file for complete search history.

(56) References Cited

U.S. PATENT DOCUMENTS

| | | | |
|---|---|---|---|
| 5,790,180 A * | 8/1998 | Wild ....................... 348/14.11 |
| 5,990,852 A | 11/1999 | Szamrej |
| 6,209,021 B1 | 3/2001 | Ahimovic et al. |
| 6,219,706 B1 | 4/2001 | Fan et al. |
| 6,222,529 B1 * | 4/2001 | Ouatu-Lascar et al. ...... 715/745 |
| 6,654,891 B1 | 11/2003 | Borsato et al. |
| 6,693,663 B1 | 2/2004 | Harris |
| 6,766,519 B1 * | 7/2004 | Burriss et al. ................ 719/321 |
| 6,904,040 B2 | 6/2005 | Salapura et al. |
| 6,973,484 B1 | 12/2005 | Singhal et al. |
| 2002/0067405 A1 | 6/2002 | McDiarmid |
| 2004/0015979 A1 * | 1/2004 | Shen et al. ................... 718/107 |
| 2004/0022222 A1 | 2/2004 | Clisham |
| 2004/0022237 A1 | 2/2004 | Elliott et al. |
| 2004/0117653 A1 | 6/2004 | Shapira et al. |
| 2004/0119814 A1 * | 6/2004 | Clisham et al. .......... 348/14.08 |
| 2004/0190489 A1 * | 9/2004 | Palaez et al. ................ 370/351 |
| 2005/0086289 A1 | 4/2005 | Rosenberg et al. |

OTHER PUBLICATIONS

Minturn, et al.: Addressing TCP/IP Processing Challenges Using the IA and IXP Processors; Intel Technology Journal, vol. 7, Issue 4, Nov. 14, 2003; pp. 39-50.
Scalable Networking: Network Protocol Offload—Introducing TCP Chimney; WinHEC 204 Version—Apr. 9, 2004; 31 pages.
Transmission Control Protocol; Darpa Internet Program; Protocol Specification; RFC: 793; Sep. 1981; 84 pages.

* cited by examiner

*Primary Examiner*—Eron J Sorrell
(74) *Attorney, Agent, or Firm*—Lando & Anastasi, LLP

(57) ABSTRACT

A method for communicating video data between a first host and a second host. The method may comprise encoding a video signal producing an encoded video signal at the first host. The method may also comprise transmitting, by the first host, the encoded video signal to the second host. The encoding and transmitting may both be performed by a first single multimedia thread of execution associated with an operating system at the first host. Other embodiments are also disclosed.

12 Claims, 7 Drawing Sheets

METHOD AND APPARATUS FOR COMMUNICATING DATA BETWEEN TWO HOSTS

RELATED APPLICATIONS

This application claims priority under 35 U.S.C. § 119(e) to U.S. Provisional Application Ser. No. 60/512,667 entitled "Method and Apparatus for Communicating Video Information," filed on Oct. 20, 2003, which is herein incorporated by reference in its entirety.

BACKGROUND

The invention relates generally to the transmission of real-time audio data, especially and/or video information, and more particularly to systems and methods for video conferencing.

There are many systems and techniques for transmitting video information especially real-time video information combined with corresponding audio or other information such as document displays. Some effective conventional techniques involve special transmission and reception systems and require dedicated communication links to encode, transmit, receive and decode video or other information. The encoding, transmission, and decoding operations are generally resource intensive in terms of the processing (e.g., memory, CPU speed) and transmission requirements (e.g., communication link bandwidth) necessary to provide an adequate video presentation. However, such special systems are generally expensive to own and operate and therefore are not available to an average consumer.

Many commercial products including hardware and/or software components have become available to the average consumer for transmitting video information over public networks, such as the Internet. These systems may be, for example, coupled with a personal computer for use over the Internet or other communication network. For example, a video conferencing or video distribution system may be configured to transmit video information over the Internet among a group of PCs. However, due to the substantial resource requirements necessary for transmitting such information, and the limited and/or unreliable resources available on public networks, performance of such systems generally fall short of expectations, and such systems are rendered less-usable than more expensive specialized systems.

The quality of a combined audio-video communication as perceived by a user is highly correlated to both the overall latency of the communication and to the difference between the latency of the audio communication and the latency of the video communication between the sending and receiving systems.

For example, latency is commonly experienced during a typical cell phone call, in that during the conversation, there are delay periods due to latency that are periodically perceived by the user. In such a scenario, the user feels like the call is not in real time, and this latency affects the actual and perceived quality of the cell phone connection. With respect to video transmission, users experience latency as time lag or "jumpiness" between consecutive video frames. Such performance is present, for example, in conventional software video conferencing solutions.

Video quality may particularly suffer when transmitting data over communication networks such as the Internet. Due to bandwidth availability and latency, conventional video conferencing solutions generally provide frame rates between 2 and 10 frames per second. For instance, the system CUseeMe (available from First Virtual Communications, Redwood City, Calif.) allows video transmission between hosts using a video conference server provides a 2-3 frame per second video signal with a latency of 450 milliseconds between capture at one host and presentation at another host. Another Internet teleconferencing system, NetMeeting (available from the Microsoft Corporation, Redmond, Wash.) delivers video information at approximately 6-10 frames per second with a latency of approximately 230 milliseconds. Further, most of these conventional systems are unable to deliver an acceptable image size at a good quality. Conventional systems that operate over public networks such as the Internet are capable of delivering, at most, 320×240 pixel video data at 6-10 fps. By contrast, video delivered at approximately 24-30 frames per second (theatrical motion pictures are shown at 24 fps, while television displays at 30 fps) provides a perception to the viewer of full-motion video. Therefore, it would be beneficial to have a system that delivers a quality video signal without latency or jumpiness between successive frames.

Contributions to latency may include and are not limited to intermediate systems, network latency and latency due to processing. Some conventional systems use intermediate systems to handle video data transmitted between hosts. More specifically, video data from one host is transmitted to another host through an intermediate system. Intermediate systems may include various security and network components as well, including but not limited to firewalls, routers and others. The extra handling performed by these systems, which includes receiving, processing, buffering, and other steps at the intermediate system, adds latency to the transmission.

In some conventional systems, there is significant network latency due to one or more components of the network connection. This latency is due, for example, to additional network transmissions through intermediate systems as discussed above, and latency in creating and establishing network connections. Further, there are other problems, in addition to latency, with establishing connections through firewalls and other secure networking systems, as discussed below.

There are other contributing factors to latency at either or both of the receiving and transmitting hosts. For instance, latency is added at either the sending or receiving host due to over-handling of the video data. Excess buffering, thread-to-thread copying of video data, and other factors contribute to this type of latency.

Modern computer networks enable communication between computers in part by assigning each connected computer an address (for example, an Internet Protocol (IP) address), and one or more ports through which communication may proceed between the assigned IP addresses. Once a logical connection between computers is established, various techniques assure the authenticity of the ongoing information transfers, for example assigning sequence numbers to packets forming part of an ongoing connection. Some network interconnectivity features and security systems such as firewalls, network address translation (NAT) features, and others conventionally used, interfere with efficient, latency-free, real-time transmission of high bandwidth information, such as video information. What is needed, therefore, is an improved method for communicating video information.

When communication between a first host computer and a second host computer is desired, and the computers are connected to each other through a communications network without an intervening firewall or an intervening device performing NAT, either host may initiate the connection by simply sending a suitable message addressed to a suitable port for the message type at the address of the other host computer. Communication using a client/server architecture, or a peer-to-peer architecture, or any other suitable architecture can be initiated in this way, absent an intervening firewall or NAT device.

Communication without an intervening firewall or NAT device sometimes occurs when host computers are connected to a common local area network (LAN), such as a corporate network or home network. More commonly, when the host computers are interconnected through a wide area network (WAN), such as the Internet, and sometimes in LAN configuration, one or both host computers may be connected to the WAN through a firewall or NAT system. A firewall or NAT system has the effect of partially or completely masking, from computer systems reachable through the WAN, the host computers behind such firewall or NAT systems. This masking is performed by rejecting unexpected messages, i.e., messages sent to closed or incorrect addresses or ports or messages purporting to be part of an ongoing exchange, but having incorrect sequence numbers.

To make a conventional feature such as worldwide web browsing work, several operations occur. Connections from a local host computer to a remote server are initiated by the local computer. If the local computer is behind a firewall, the local computer initiates communication with a desired server, through the firewall. By initiating the communication through the firewall, the local computer instructs the firewall to allow certain types of communications back from the server for a certain period of time. When the server replies using a correct address, port and sequence number, the firewall recognizes the response as expected and passes the response on to the local computer. While the server may also be located behind a firewall, that firewall conventionally has a known port open to inbound traffic, so that certain types of contact with the server are permitted by the firewall.

To allow a direct peer-to-peer connection, a port is conventionally opened in the firewall of each participant that is connected to the network through a firewall, so that contact with any participant may be initiated by any other participant, however, this leaves each participant with at least one port of their firewall open and vulnerable to security breaches. In such applications as video and/or teleconferencing through the Internet, where direct, peer-to-peer connections are desirable for the purpose of minimizing latency, it is highly desirable to minimize the security risk to the computers of participants, while also allowing any participant to initiate a connection with minimal effort.

In some conventional systems, an event loop is used to process video information. This is generally in the form of a single thread (e.g., a thread of execution executed by a processor) that executes in an infinite loop. The thread waits until an event happens, and when an event occurs, the thread acts upon the event. Generally, only a single event can be processed at a time. Other threads can add events to the thread's workload, but the other threads cannot actually handle these events. This event loading causes the thread to become overloaded, and therefore, a particular event (e.g., a video transmission, encoding or decoding event) that needs to be processed is delayed. A simple example describing this issue is a worker scenario where a particular worker has multiple bosses, each of which generates work for the worker to perform. In performing a particular work task for one of the bosses, tasks requested of other bosses become delayed and must wait for the task currently being performed to be completed.

SUMMARY OF INVENTION

According to one aspect of the invention, methods and apparatuses are provided that establish a low-latency connection between two hosts. In one embodiment of the present invention, such a connection may be made over a public network such as the Internet. However, it should be realized that various aspects of the present invention may be used with any network type (e.g., within an enterprise network, virtual private network (VPN), etc.) or any combination of networks and network communication types (e.g., Ethernet), and the invention is not limited to any particular network or combination of networks. Moreover, although the invention will be explained in the context of video conferencing, aspects of the invention have wider data communication applicability.

The human threshold for perceiving latency is approximately 100 msec. Therefore, by communicating a video signal at or below this threshold between two hosts increases the perceived quality of the transmission to a user viewing the video signal.

Firewalls pose a particular latency problem for transmitting data by requiring reconnection of connections that have timed out. As previously explained, firewalls allow and maintain connections that are initiated from a secure side of the firewall. As also previously explained, reverse traffic from other hosts are allowed in if they can be attributed to an allowed connection initiated from the secure side. For security reasons, firewalls delete allowed connections after a period of nonuse.

In one aspect of the invention, a host operating on a secure side of a firewall is adapted to periodically transmit a packet to a directory server to maintain that port open to the firewall for receipt of packets from one or more other hosts.

According to one aspect of the invention, it is realized that the lowest timeout value on commercially-available firewalls is 30 seconds. Therefore, periodic keep-alive messages are transmitted by the host to the directory server with a period shorter than the timeout to maintain the connection established through the firewall.

Port connections to a particular host may be registered with the directory server, and port connection information for the particular host can be communicated to another host for the purpose of establishing a connection between the two hosts. That is, video traffic is sent by the other host to the first host, located to the registered port at the firewall. Information stored in the directory server may include an IP address, a port number, and other security information expected by the firewall. In this manner, the first host on the secure side of the firewall maintains a connection through which another host can pass video traffic. It is conversely true that the second host may also be located beyond a firewall, and may also register its port information with the directory server in order to facilitate the transfer of video information from the first host to the second host through the firewall associated with the second host. In this manner, a true host to host (or peer to peer) connection may be established between hosts. Because the connection does not involve an intermediate server in the ordinary transmission of data packets (e.g., video data, audio data, etc.) latency is reduced.

A method for communicating data between at least a first host and a second host comprises: identifying, at a server, address information of the first host, to which the second host may communicate data through a network security system coupled between the first host and the server; and communicating, from the second host to the first host, data using the address information of the first host. The method may further comprise: identifying, at the server, address information of the second host, to which the first host may communicate data, through a network security system coupled between the second host and the server; and communicating, from the first host to the second host, data using the address information of the second host. The second host may be adapted to perform the act of communicating without use of an intermediate server. The method may also further comprise communicating periodically, from the first host to the server, through the network security system, so as to maintain an open communication channel through the network security system to the first host at the address of the first host. The address information of the first host may include an address and a port information.

Preferably, both video and audio information is transmitted in real or near-real time between two hosts such that a user of at least one of the hosts perceives a real-time communication, that is, latency should be reduced below 100 mS for each. According to various aspects of the present invention, one or more of the above methods may be performed to reduce latency between hosts, and the invention is not limited to any particular combination of methods. For instance, separate receive and transmit threads may be used independently of any network considerations and still provide a performance improvement in transmitting and processing a video signal.

According to another aspect of the present invention, a system is provided that delivers full-motion video with a low latency to provide a near real-time perception by a user. In one aspect of the present invention, video is provided at near telephone (POTS) latency, and therefore allows the transmission of video information over a public network such as the Internet and transmission of audio information over a standard telephone connection. It is realized that latency of a telephone signal is approximately 60 msec. Therefore, by communicating video information between hosts near this latency, there is no perceived delay between the video and audio information, and therefore, the transmission of video may be easily added to an existing telephone connection. Flexibility is increased, as the telephone is more frequently used to perform communications (versus the time and effort to establish a video conference) and therefore, augmenting a standard telephone call with video is more likely to be performed.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
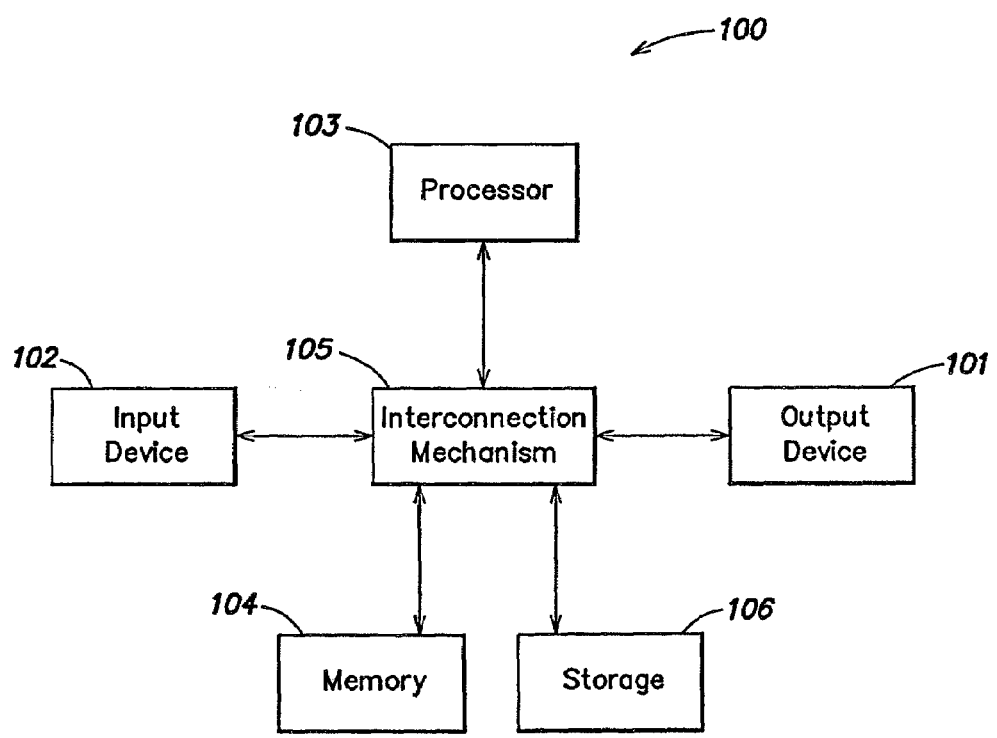
FIG. 1 is a schematic block diagram of a computer system in which aspects of the invention may be embodied.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Embodiments of aspects of the present invention form and maintain an open channel for communication between two or more systems (e.g., computer systems) coupled by a communication network. In one embodiment, one or more intermediate security devices (e.g., firewalls, NAT devices) are interposed between the two or more systems. The open channel may be formed first by communicating with a directory service, and then establishing direct communication in which the directory service remains outside of the communication path of the channel.

In conventional media transmission systems such as video conferencing and other systems, information is transmitted between computers by way of an intermediate server. This intermediate server receives information from one computer, buffers the information, and transmits the information to one or more other computers. According to one aspect of the present invention, a communication method is provided that allows peer-to-peer communication without an intermediate server system. A direct peer-to-peer communication reduces the amount of latency in communicating information (e.g., video, audio) information between a sending and receiving system, as the need for buffering information at another system is eliminated, and multiple receive and transmits of the information (e.g., to/from the intermediate server) is no longer necessary. In one aspect of the present invention, it is realized that latency in communicating information between systems affects the perceived quality of the communication between systems (e.g., in a videoconferencing system), and it may be beneficial to minimize the amount of latency in communicating the information between systems. In one embodiment, the directory service system maintains information relating to the two or more systems that allows any of the individual systems to establish one or more direct communication channels with another system that is registered with the directory service system.

According to another aspect of the invention, messages are periodically sent to maintain the open connection through an intermediate security system (e.g., NAT device, firewall) such that a system located beyond the intermediate security system may receive peer-to-peer connection requests directly. By maintaining the connection through the security system, latency associated with creating a connection is reduced.

Other aspects of the present invention relate to reducing latency of the communication between systems by modifying ways by which the sending and receiving systems process data. According to one aspect, it is realized that existing systems use inefficient programming methods for sending, receiving and processing data.

Figure 7:
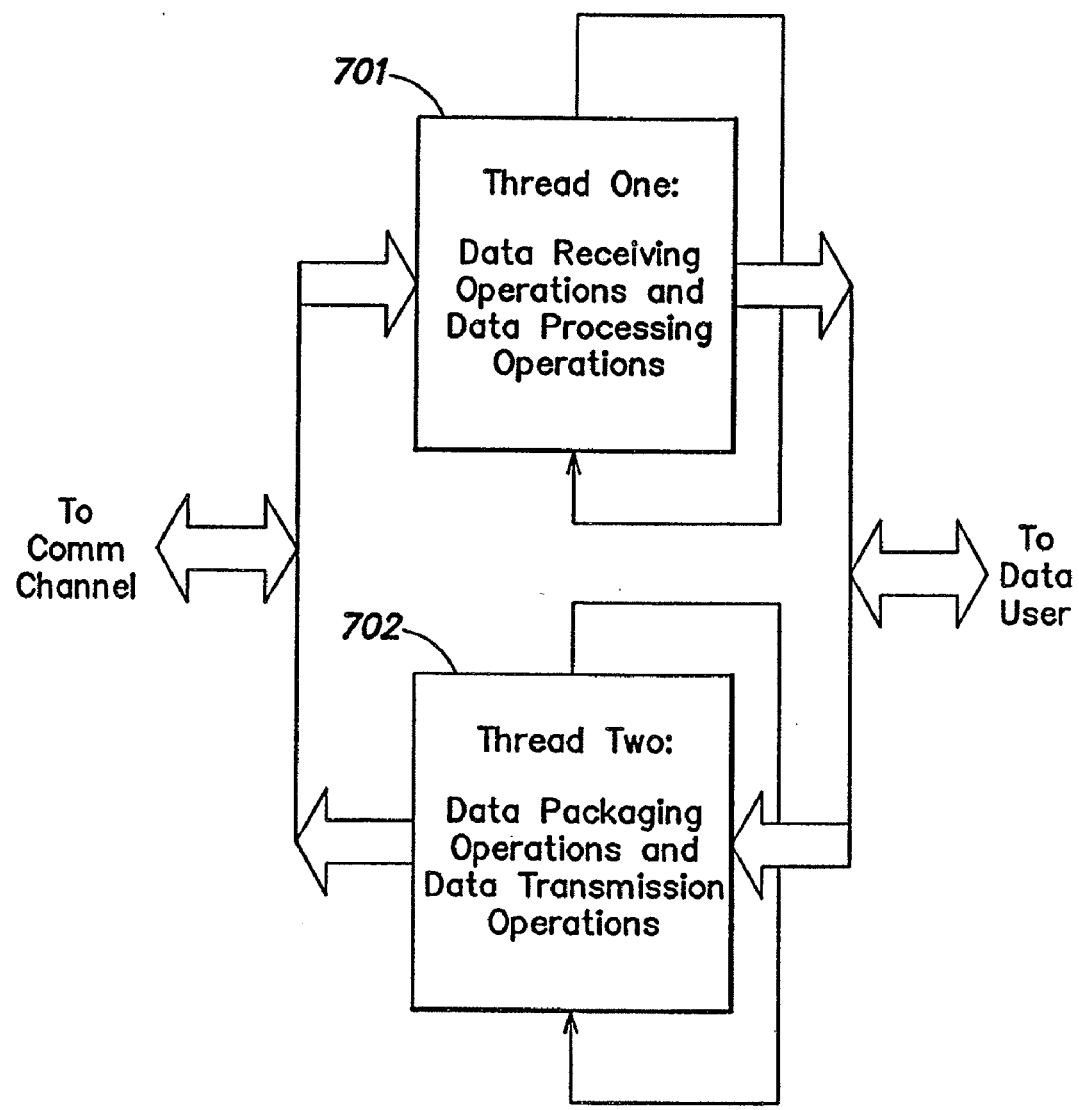
FIG. 7 is a threading diagram showing process flow and data flow according to aspects of an embodiment of the invention.

According to aspects of embodiments of the invention shown in FIG. 7, implementing dual, single threads, one of which, block 701, handles receipt of data and one of which, block 702, handles transmission of data allows more efficient handling of video data. Receiving and processing of a packet, block 701, is made independent of sending video data, block 702, and receiving and sending can occur concurrently because the threads, blocks 701 and 702, execute independently. In some conventional systems, an event loop is used to process video information. The event loop takes the form of a single thread that executes in an infinite loop. The thread waits until an event occurs, and then the thread acts upon the event. In such a design, only a single event can be processed at a time. Other threads can add events to the event loop thread's workload, but the other threads cannot actually handle these events. This event loading causes the single event loop thread to become overloaded, and therefore, a particular event, e.g., a video transmission, encoding or decoding event that needs to be processed is delayed.

In one embodiment, the system is dual-threaded, having a separate receiving thread, block 701, and transmission thread, block 702, however the receiving thread is single-threaded as to all receiving functionality and the transmission thread is single-threaded as to all transmission functionality. The sending or transmission thread, of one embodiment encodes video data and the audio data and places them on the transmitter. In another embodiment, the sending thread may be a video multimedia thread that performs encoding and transmission. This thread may be, for example, a near real-time thread included in the OS (e.g., Windows NT or other operating system) that calls a function periodically corresponding to the encoding function. For example, in Windows, an encoding function may be provided to the OS by a callback at 30 fps. The function is then called every $\frac{1}{30}$ second, and this single thread is used to perform the encoding and transmission of data. Because there are no thread-to-thread copies of data, latency is reduced. Also, because the thread is at a near-real time priority, the thread experiences less delay than a thread having lesser priority.

Similarly, in one embodiment the receiving thread, which is separate from the transmitting thread, receives the video data and the audio data and decodes them for display and/or playback. Decoding may be performed by an operating system callback, as well.

According to embodiments of other aspects of the invention, a dual, single-thread software design reduces processing latency, so that conventional, low-latency audio signal paths can be used to transmit and receive an audio signal while a corresponding video signal is simultaneously transmitted and received through a computer communication network having sufficiently low latency that the video signal and the audio signal are perceived as being synchronized.

Embodiments of aspects of the present invention may be practiced on special purpose or general purpose computers, as now described.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to collect information and communicate over a network, according to various embodiments of the invention. Further, the exemplary video conferencing system may be located on a single computer or may be distributed among a plurality of computers attached by a communications network.

A general-purpose computer system according to one embodiment of the invention is configured to perform any of the described video conferencing functions including but not limited to collecting video or audio information, transmitting the video or audio information, receiving the video or audio information or performing directory services. It should be appreciated that the system may perform other functions, including network communication, and the invention is not limited to having any particular function or set of functions.

For example, various aspects of the invention may be implemented as specialized software executing in a general-purpose computer system 100 such as that shown in FIG. 1. The computer system 100 may include a processor 103 connected to one or more memory devices 104, such as a disk drive, memory, or other device for storing data. Memory 104 is typically used for storing programs and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100.

Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition or as an alternative to the interconnection mechanism 105.

Figure 2:
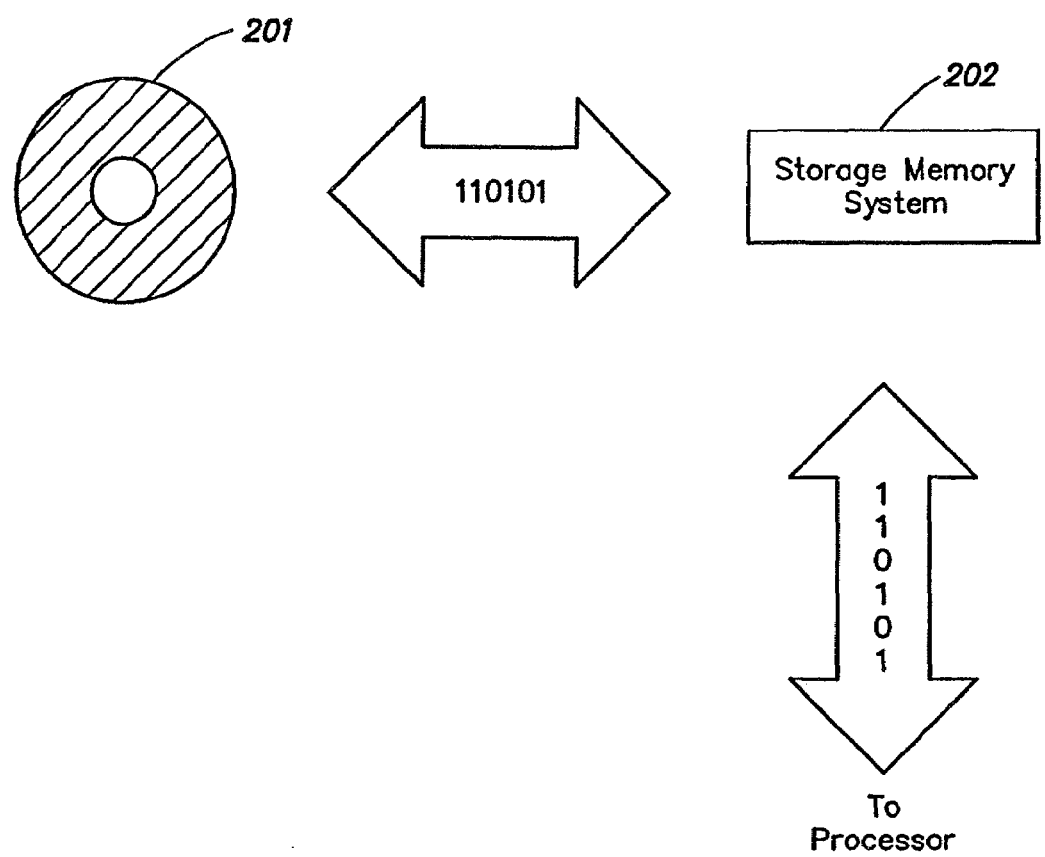
FIG. 2 is a schematic block diagram of the storage system of the computer system of FIG. 1.

The storage system 106, shown in greater detail in FIG. 2, typically includes a computer readable and writeable nonvolatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is not limited to a particular memory system 104 or storage system 106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of the invention may be practiced, it should be appreciated that aspects of the invention are not limited to being implemented on the computer system as shown in FIG. 1.

Various aspects of the invention may be practiced on one or more computers having a different architecture or components that that shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Figure 3:
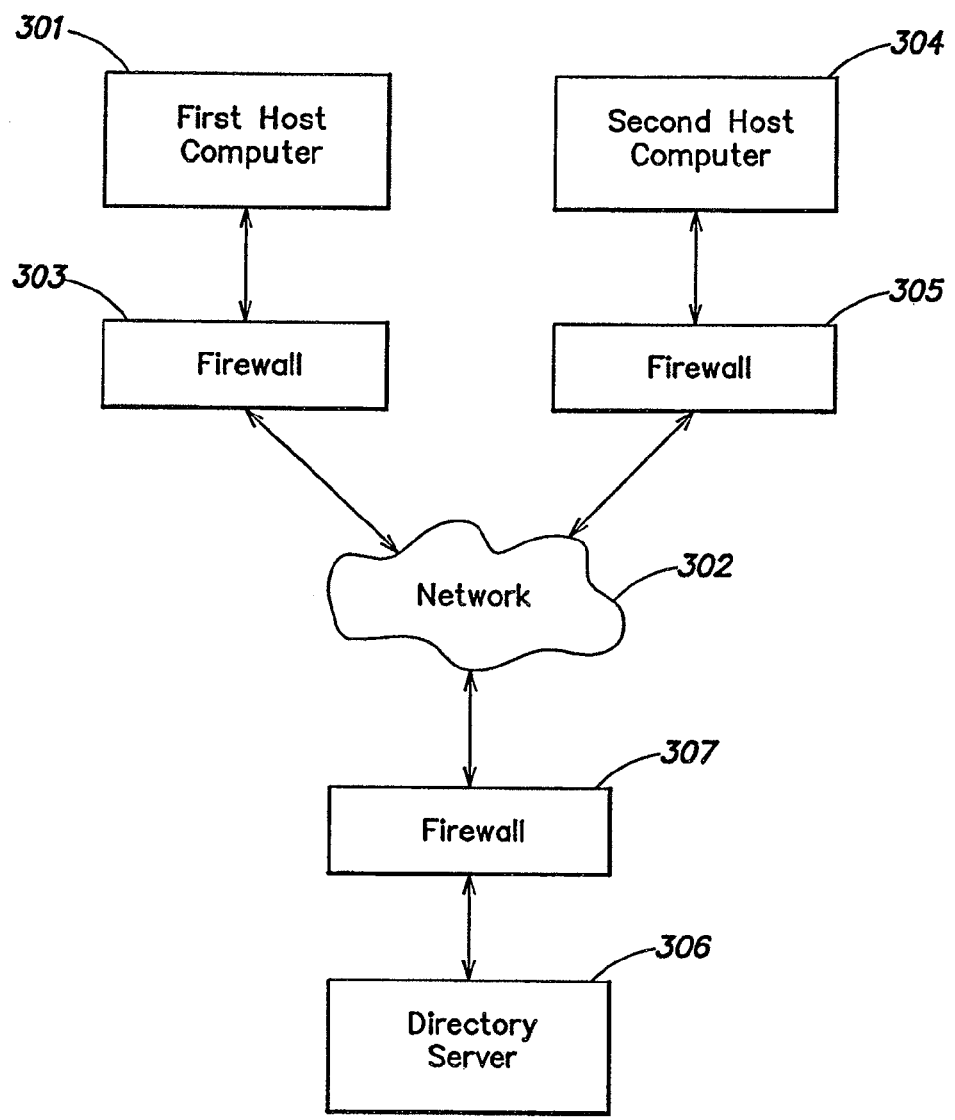
FIG. 3 is a schematic block diagram of a network topology in which aspects of embodiments of the invention may be realized.

Embodiments of aspects of the present invention are now illustrated with reference to a particular network topology as shown in FIG. 3. Any suitable variation on this topology may alternatively be employed. For example, additional routers, gateways, switches, firewalls, servers, hardware components and others not shown may be present in suitable configurations in the network. The illustrative topology includes a first host computer, 301, connected to a communication network, 302, for example, the Internet, through a firewall, 303, a second host computer, 304, connected to the communication network, 302, through a firewall, 305, and a directory server, 306, also connected to the communication network, 302, through a firewall, 307. The method to be described illustrates the behavior of the system when one party, a calling party, having access to the first host computer, 301, desires to establish communication with another party, a called party, having access to the second host computer, 304. The first host computer and its user will be collectively referred to as the "calling party" while the second host computer and its user will be collectively referred to as the "called party." As discussed above, the calling party cannot establish direct communication with the called party. Unexpected packets of information sent from the calling party to the called party in the attempt to establish the communication channel will be rejected by the called party's firewall system, e.g., firewall 303 or firewall 305.

Figure 4:
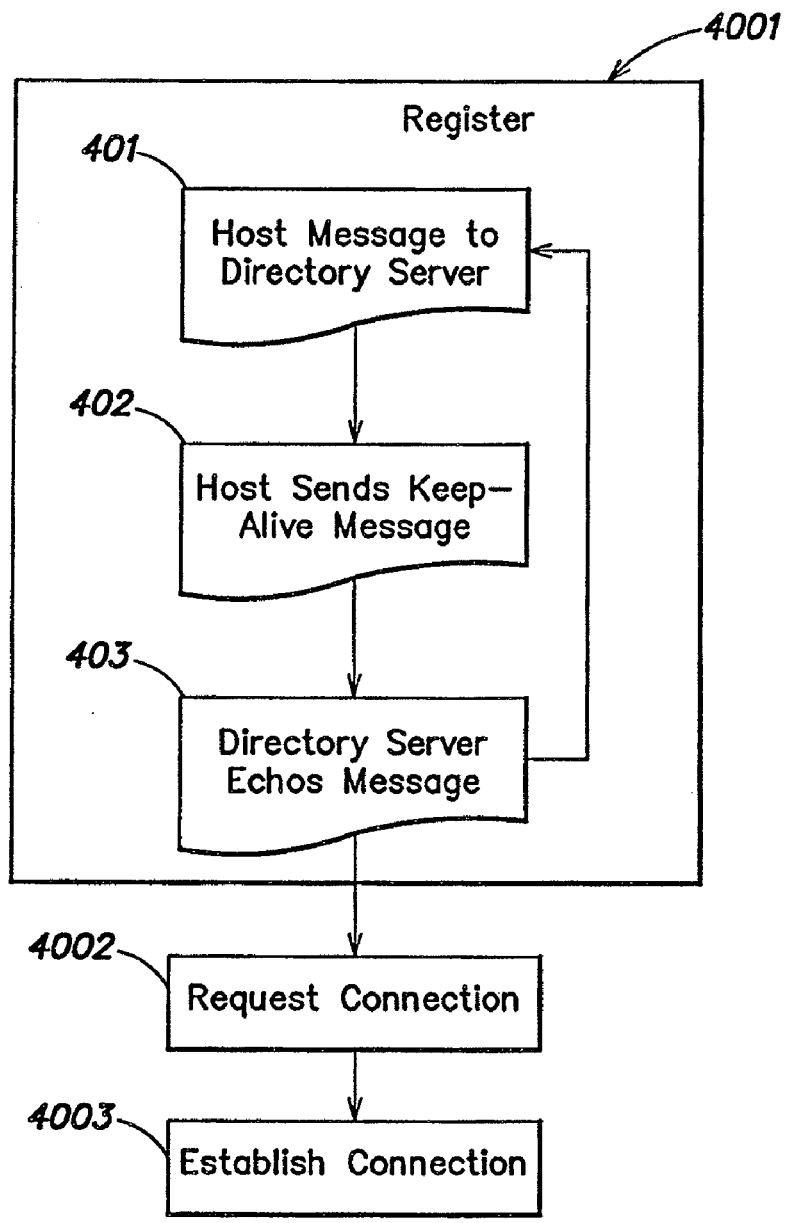
FIG. 4 is a flow diagram illustrating a method embodying aspects of embodiments of the invention.

According to a method embodying aspects of the invention, illustrated by the flow diagram of FIG. 4, the directory server maintains open channels to each party, referred to as secondary channels, until a direct channel is established between a calling party and a called party, then steps out of the path.

Both the calling party and the called party first register their availability with the directory server, 4001. Looking first at the called party, in order to register, the called party opens a port through the firewall (FIG. 3, 303 or 305) protecting the called party by sending a message to the directory server (FIG. 3, 306), through which a secondary channel is established with the directory server, 401. Although the directory server (FIG. 3, 306) is also protected by a firewall (FIG. 3, 307), that firewall has a known open port through which the message is sent. The called party indicates through that channel, indeed through the contents of the message sent, its availability for communication.

Importantly, the called party maintains the communication channel with the directory server in an open and available state, by periodically sending keep-alive messages to the directory server, 402, which must echo or acknowledge the keep-alive messages back to the called party, 403, so as to keep the port open through the firewall (FIG. 3, 303 or 305) protecting the called party.

When the calling party desires to register, the calling party performs registration steps similar to those described in connection with the called party, 4001. Thus, the calling party opens a port through the firewall (FIG. 3, 303 or 305) protecting the calling party. A secondary channel is then established through the open port, to the directory server (FIG. 3, 306). The calling party then indicates to the directory server (FIG. 3, 306) its availability for communication, and its desire to communicate with the called party. Like the called party described above, the calling party also sends keep-alive messages to the directory server, 402, and these messages are echoed or acknowledged back to the calling party, 403, so as to keep the firewall protecting the calling party open for receiving messages. The registration messages and the keep-alive messages may contain the same information, or they may contain different, specialized information, as desired. Through the content of the registration messages from each calling party and from each called party, the directory server acquires information identifying the addresses and ports through which the calling party and the called party are communicating.

When the calling party indicates a desire to establish direct communication with the called party, 4002, the directory server instructs the calling party and the called party to communicate directly through each one's established open channel, 4003. When the directory server instructs the calling party and the called party, 4003, the instructions include the address, port and sequence number information, or any other suitable information required to establish direct communications. Messages from the calling party to the called party or from the called party back to the calling party do not pass through the directory server, but rather, the messages travel directly from one host to the other through one or more communication networks.

Figure 5:
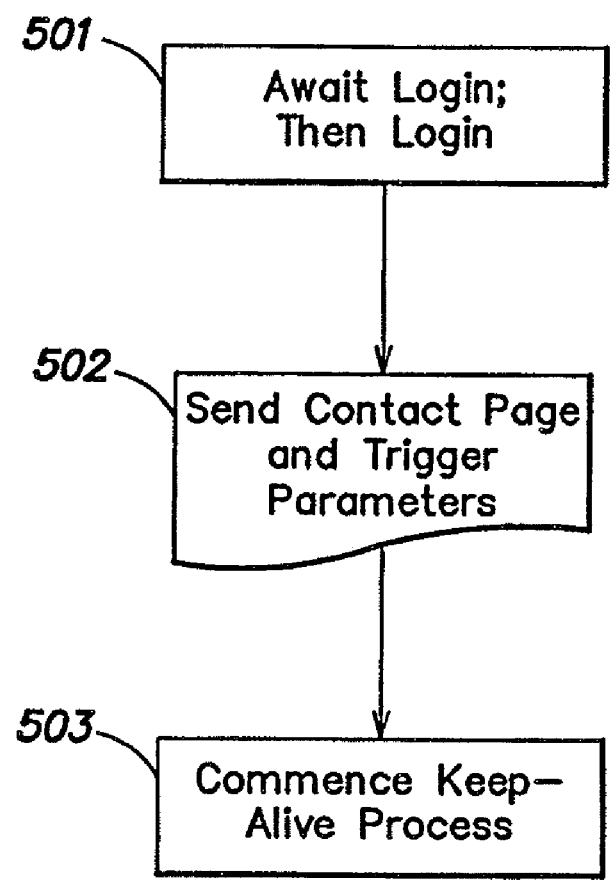
FIG. 5 is a flow diagram detailing the registration process of the method of FIG. 4.

The processes just briefly described are now described in greater detail in connection with the flow diagrams of FIGS. 5-7.

According to this illustrative embodiment, all parties to a video conference register with the directory server. The directory server awaits contact from each host desiring to register with the directory server; each host first logging in using a push script (FIG. 5, 501). If the login parameters (for example, email address and password) are valid, then the server returns a contact list result page, together with a group of triggered parameters attached to the URL for the contact list result page (FIG. 5, 502). The triggered parameters include a user ID number for the host, a session ID number for security purposes which is valid until the host logs out, the directory server name, i.e. the DNS name of the server to contact for the secondary channel to be established and the directory server port, i.e. the port on the directory server to connect to. Other triggered parameters could be used depending upon implementation, and other implementations may not require all of the triggered parameters given above. After registration is complete, the keep-alive process is commenced (FIG. 5, 503).

The keep-alive process involves sending packets through the secondary channel between the host and the directory server on a regular basis to keep the channel open. The packet may contain useful status information to be processed or displayed by the server, such as status information (e.g., busy or away) as well as the host computer's internal IP address, the host computer's internal port, the host computer's internal hardware MAC address, as well as any other useful information that may be desired by the system designer. In this exemplary embodiment, the directory server records all the information mentioned above, including the physical source IP address and the port from which the packet was sent. Because firewall and NAT devices change the source IP address and port as packets pass through them, this information is useful for later sending packets directly back to a particular host. For example, if the information collected by the directory server shows a mismatch between the internal IP address and port and the external IP address and port for a particular packet sent by a particular host, then the host is protected by or behind either a firewall or NAT device. This information helps establish which local area network a particular host may be a member of, as will be required below. The host should send these keep-alive packets periodically with a time between packets short enough that the firewall system protecting the host computer will be fooled into thinking that the directory server and the host computer are in continuous communication, and thus leave the channel open to receive unsolicited packets at the host when needed. Once at least two parties, i.e. host computers have registered with the directory server, a connection can be initiated.

Figure 6:
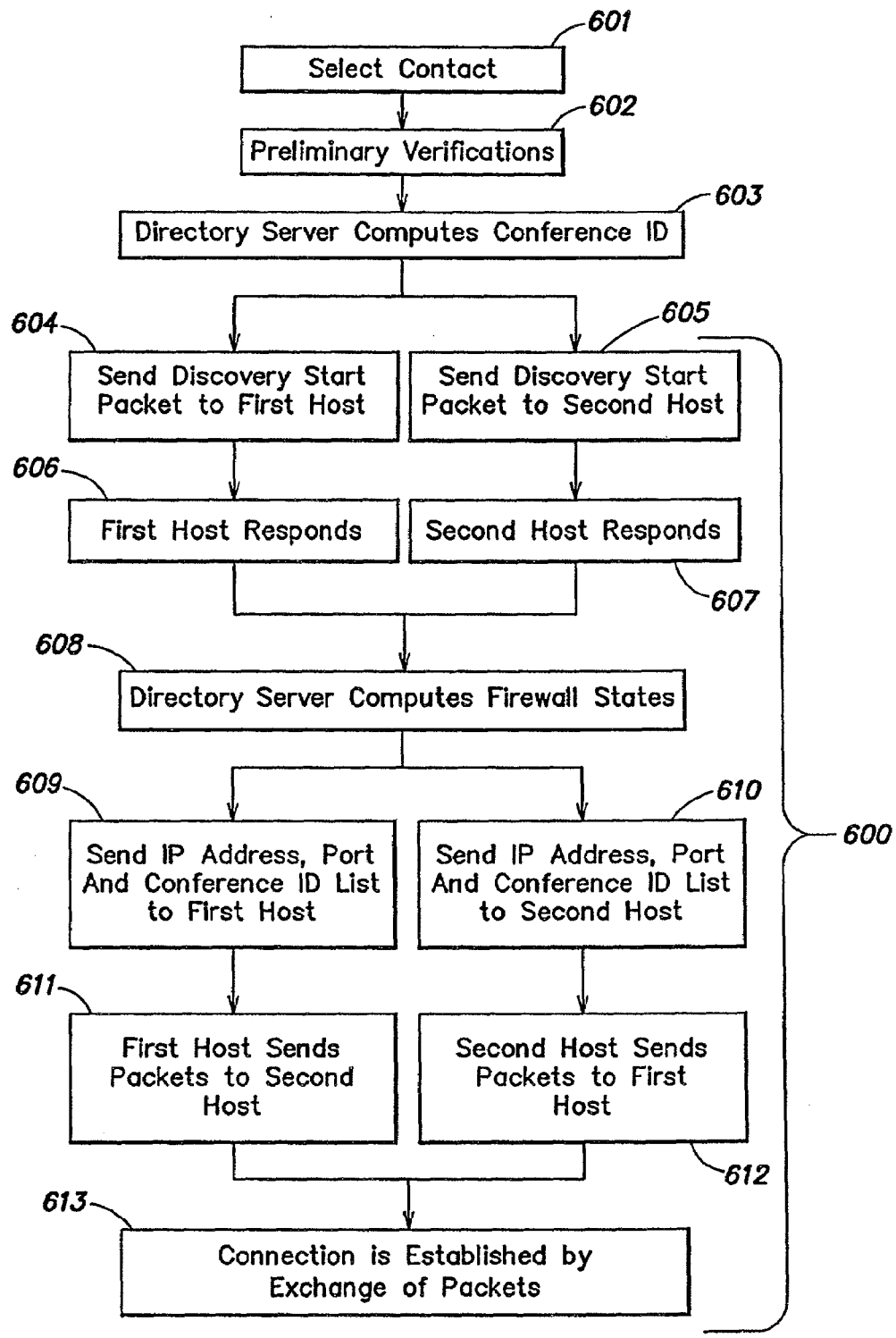
FIG. 6 is a flow diagram detailing the conference initiation process of the method of FIG. 4.

To initiate a conference, as shown in FIG. 6, first the calling party selects a called party from the contact list page displayed upon registration, at block 601. The selection may be made by any suitable means, for example by using a pointing device to click on, and thus select, the called party's nickname in a displayed list of potential contacts. Several initial verifications are performed, for example, billing verifications and a determination as to whether the calling party and the called party are on the same local area network or different local area networks, at block 602. A conference ID is computed at block 603, so that further communication in connection with the present conference can be identified as such. If the calling party and the called party are on different networks, the discovery process 600 may commence.

An example discovery process 600, according to one embodiment, proceeds as follows. The discovery process, 600, leads to an establishment of direct communications.

First the directory server sends discovery start packets, at blocks 604 and 605, to the calling party and to the called party. The discovery start packets can be sent in parallel, as shown, or in a sequence. The discovery start packets request each host to return one or more packets to a specified IP address and part of the directory server. The hosts reply at blocks 606 and 607, with the requested packets. The directory server determines at block 608, in a manner similar to that discussed above in connection with the keep-alive process, the current state of any firewalls. The IP address and port combinations are computed by the directory server on the basis of the secondary communication channel presently established for the called party, on the basis of heuristics or stored information defining the behaviors of known firewall systems. The directory server then sends at blocks 609 and 610, a list of communication parameters upon which each host will base its conference start packets. The parameters include IP address and port combinations, corresponding to the host, together with corresponding conference ID numbers. The IP address and port combinations include the expected values for one or more types of firewalls, preferably including the expected values for all known types of firewalls, given the stat of the secondary communication channel through the actual firewall upon which the calculation is based.

At blocks 611 and 612, each host then sends a conference start packet to each of the combination of IP address and port for the conference ID given in the list just received at blocks 609 and 610.

It is expected that at least one conference start packet will get through in each direction. When each host receives a conference start packet directly from the other, at block 613, a two-way direct communication between the calling party and called party is established through a primary channel. No keep-alive process is required to keep the primary channel open, even if packets become lost en route from one host to the other, because each host is continuously sending data to the other, thus keeping their own firewall open for return packets from the other.

The keep-alive process between each host and the directory server, described above, however, continues in the background, to insure that the secondary channel is not lost in the event that the number and period of the packets transmitted between each host and the directory server falls below the threshold of one of the firewalls for keeping a port open. This allows the directory server to initiate communications with the hosts, for example to update the list of contacts available to the host when a contact registers or deregisters with the directory server.

If the process described fails to produce a successful direct connection for a conference, then any suitable retry, recovery or fall-back method may be employed to improve the chances of successfully establishing the direct connection. In the case of such a failure, the key elements of communication between each of the hosts and the directory server are used in the retry, recovery or fall-back method, as it is those elements that permit direct communication of unexpected messages, such as the conference start message, to a host protected by a firewall.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for communicating video-conference communication data between a first host and a second host, comprising:
    at the first host, encoding at least a portion of the video-conference communication data producing a first encoded video-conference signal;
    transmitting, by the first host, the first encoded video-conference signal to the second host for processing and display at the second host, wherein encoding and transmitting are both performed by a first single multimedia thread of execution of an operating system at the first host;
    at the first host, receiving a second encoded video-conference signal from the second host; and
    decoding, by the first host, the second encoded video-conference signal producing a decoded video-conference signal, wherein decoding and receiving are both performed by a second single thread of execution separate from the first single multimedia thread of execution, at the first host,
    wherein the first single multimedia thread is single-threaded to only perform encoding and transmission functionality of the first host, and
    wherein the first host is dual threaded such that latency in the first host is minimized.

2. The method according to claim 1, wherein the method comprises performing a callback, by the first single multimedia thread, to perform encoding and transmitting.

3. The method according to claim 1, wherein the second single thread of execution is a second single multimedia thread of an operating system of the first host, and wherein the method comprises performing a callback, by the second single multimedia thread, to perform decoding and receiving.

4. The method according to claim 1, further comprising:
    sending an audio signal to the second host independently from transmitting the first encoded video-conference signal to the second host, the audio signal comprising at least a second portion of the video-conference communication data.

5. A system for communicating video-conference communication data over a data path between a first host and a second host comprising:
    in the first host, a processor executing a software program performing the method of claim 1.

6. The system according to claim 5, wherein the method comprises performing a callback, by the first single multimedia thread, to perform encoding and transmitting.

7. The system according to claim 5, wherein the second single thread of execution is a second single multimedia thread of an operating system of the first host, and wherein the method comprises performing a callback, by the second single multimedia thread, to perform decoding and receiving.

8. The system according to claim 5, further comprising:
    an audio signal path connecting the first host and the second host, independent of the data path.

9. A computer-readable medium having stored thereon a plurality of machine instructions for controlling at least one system to perform a method, the method comprising:
    at a first host, encoding at least a portion of the video-conference communication data producing a first encoded video-conference signal;
    transmitting, by the first host, the first encoded video-conference signal to a second host for processing and display at the second host, wherein encoding and transmitting are both performed by a first single multimedia thread of execution of an operating system at the first host;
    at the first host, receiving a second encoded video-conference signal from the second host; and
    decoding, by the first host, the second encoded video-conference signal producing a decoded video-conference signal, wherein decoding and receiving are both performed by a second single thread of execution separate from the first single multimedia thread of execution, at the first host,
    wherein the first single multimedia thread is single-threaded to only perform encoding and transmission functionality of the first host, and
    wherein the first host is dual threaded such that latency in the first host is minimized.

10. The computer-readable medium of claim 9, wherein the method comprises performing a callback, by the first single multimedia thread, to perform encoding and transmitting.

11. The computer-readable medium of claim 9, the method further comprising:
    wherein the second single thread of execution is a second single multimedia thread of an operating system of the first host, and wherein the method comprises performing a callback, by the second single multimedia thread, to perform decoding and receiving.

12. The computer-readable medium of claim 9, the method further comprising:
    sending an audio signal to the second host independently from transmitting the first encoded video-conference signal to the second host, the audio signal comprising at least a second portion of the video-conference communication data.

* * * * *

UNITED STATES PATENT AND TRADEMARK OFFICE
CERTIFICATE OF CORRECTION

PATENT NO. : 7,636,805 B2  
APPLICATION NO. : 10/833363  
DATED : December 22, 2009  
INVENTOR(S) : Rosenberg Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C 154(b) by 518 days.

Signed and Sealed this
Eighteenth Day of January, 2011

David J. Kappos
*Director of the United States Patent and Trademark Office*